United States Patent [19]

Stephenson et al.

[11] Patent Number: 4,949,247
[45] Date of Patent: Aug. 14, 1990

[54] SYSTEM FOR TRANSFERRING MULTIPLE VECTOR DATA ELEMENTS TO AND FROM VECTOR MEMORY IN A SINGLE OPERATION

[75] Inventors: R. Ashley Stephenson, Tewksbury; Kevin B. Normoyle, Ashland, both of Mass.

[73] Assignee: Stellar Computer, Inc., Newton, Mass.

[21] Appl. No.: 159,362

[22] Filed: Feb. 23, 1988

[51] Int. Cl.⁵ .................... G06F 13/00; G06F 15/347
[52] U.S. Cl. .................... 364/200; 364/736; 364/232.21; 364/244.8; 364/256.8
[58] Field of Search ... 364/200 MS File, 900 MS File, 364/736

[56] References Cited

U.S. PATENT DOCUMENTS

| | | | |
|---|---|---|---|
| 4,128,880 | 12/1978 | Cray, Jr. | 364/200 |
| 4,617,625 | 10/1986 | Nagashima et al. | 364/200 |
| 4,620,275 | 10/1986 | Wallach et al. | 364/200 |
| 4,636,942 | 1/1987 | Chen et al. | 364/200 |
| 4,656,581 | 4/1987 | Ohwada | 364/200 |
| 4,661,900 | 4/1987 | Chen et al. | 364/200 |
| 4,706,191 | 11/1987 | Hamstra et al. | 264/200 |
| 4,725,973 | 2/1988 | Matsuura et al. | 364/900 |
| 4,745,547 | 5/1988 | Buchholz et al. | 364/200 |
| 4,755,931 | 7/1988 | Abe | 364/200 |
| 4,760,545 | 7/1988 | Inagami et al. | 364/200 |
| 4,761,754 | 8/1988 | Kinoshita | 364/736 |
| 4,766,535 | 8/1988 | Auerbach et al. | 364/200 |
| 4,825,361 | 4/1989 | Omoda et al. | 364/736 X |

OTHER PUBLICATIONS

S. G. Tucker, "The IBM 3090 System: An Overview", IBM Systems Journal, vol. 25, No. 1, 1986, pp. 4–19.
W. Buchholz, "The IBM System/370 Vector Architecture", IBM Systems Journal, vol. 25, No. 1, 1986, pp. 51–62.
R. S. Clark et al., "Vector System Performance of the IBM 3090", IBM Systems Journal, vol. 25, No. 1, 1986, pp. 63–82.
D. H. Gibson et al., "Engineering and Scientific Processing on the IBM 3090", IBM Systems Journal, vol. 25, No. 1, 1986, pp. 36–50.
Y. Singh, "IBM 3090 Performance: A Balanced System Approach", IBM Systems Journal, vol. 25, No. 1, 1986, pp. 20–35.

Primary Examiner—Raulfe B. Zache
Assistant Examiner—Florin Munteanu
Attorney, Agent, or Firm—Fish & Richardson

[57] ABSTRACT

Apparatus for performing vector operations on the data elements of vectors includes a vector processor for performing arithmetic operations on the elements, a vector memory for storing the data elements for use by the processor, the vector memory having a port for reading and writing, and at least one staging register interposed between the vector memory port and the processor; the port and the register are each sufficiently wide to span more than one data element. As a result, on average fewer than one read or write operation per data element is required to access the vector memory via the port. Access to the vector memory port (i.e., a shared resource) is managed between a number of users by preassigning each user time slots that occur from time to time in each of which only one user is premitted to request access to the vector memory port, establishing a nominal priority ranking of types of requests made by the users for governing the order in which the users will be served, providing an arbitration mechanism for resolving conflicting requests by the users for access to the vector memory port based on the types of requests, and modifying the nominal priority ranking to temporarily lower the priority of a type of request made by a user that has previously been given access to the vector memory port as a result of the arbitration mechanism but has been unable to execute the access.

9 Claims, 4 Drawing Sheets

VECTOR RAM TRANSFERS

| Transfers to Staging Registers (tick) | | Transfers From Destination Registers (tick) |
|---|---|---|
| $t_{-1}$ | Load Source Staging Register 40 with elements 1-16 of operand A | |
| $t_0$ | Load Source Staging Register 42 with elements 1-16 of operand B | |
| $t_1$ | Start first vector operation | |
| | Store results 1-8 from Destination Staging Register 44 | $t_{12}$ |
| $t_{15}$ | Load Source Staging Register 40 with elements 17-32 of operand A | |
| $t_{16}$ | Load Source Staging Register 42 with elements 17-32 of operand B | |
| $t_{17}$ | Start 17th vector operation | |
| | Store results 9-16 from Destination Staging Register 44 | $t_{20}$ |
| | Store results 17-24 from Destination Staging Register 44 | $t_{28}$ |
| $t_{31}$ | Load Source Staging Register 40 with operand C elements 1-16 for next vector inst. | |
| $t_{32}$ | Load Source Staging Register 42 with operand D elements 1-16 for next vector inst. Complete 32nd operation of 1st vector inst. | |
| | Store results 25-32 from Destination Staging Register 44 | $t_{36}$ |

FIG. 2

SYSTEM FOR TRANSFERRING MULTIPLE VECTOR DATA ELEMENTS TO AND FROM VECTOR MEMORY IN A SINGLE OPERATION

BACKGROUND OF THE INVENTION

This invention relates to storing operands and results of vector operations in a computer.

In a vector operation, the same step (such as an arithmetic computation) is performed on all of the elements of a data vector (i.e. operands). Often, the operands are fetched from memory via a vector register file before being operated on by the vector processor (e.g., a floating point processor). And the vector results are likewise transferred back to the memory via the vector register file. The vector processor and register file collectively are known as a vector unit.

In order to provide temporary storage of as many vector elements (operands and results) as practical, random access memory (RAM) is often used in place of discrete registers to implement the register file. The vector RAM needs to have a high bandwidth capable of handling data transfers to and from the vector processor and the main memory. Sometimes the bandwidth is achieved by providing multiple ports on the RAM. Another approach is to perform multiple RAM accesses per cycle. Other schemes partition the vector register files into multiple independent RAMs.

SUMMARY OF THE INVENTION

A general feature of the invention provides apparatus for performing vector operations on the data elements of vectors; the apparatus includes a vector processor for performing arithmetic operations on the elements, a vector memory for storing the data elements for use by the processor, the vector memory having a port for reading and writing, and at least one staging register interposed between the vector memory port and the processor; the port and the register are each sufficently wide to span more than one data element; as a result, on average fewer than one read or write operation per data element is required to access the vector memory via the port.

In preferred embodiments, the vector memory has a single port or a plurality of ports for reading and writing and is organized in lines of memory, each containing multiple data elements, and the staging register is capable of containing multiple data elements, whereby the multiple data elements are transferred between a line of memory and the staging reqister in a single access. The vector memory port is coupled to a plurality of operand staging reqisters and a result staging register, which are in turn coupled to the vector processor (e.g. a floating point processor), and each register is capable of containing multiple data elements. In one access to the vector memory multiple data elements are transferred to one operand staging register, and in a second access multiple operands are transferred to a second operand staging register. As a result, the vector processor operates on multiple operands via the operand staging registers while requiring access to the vector memory only twice. Similarly, as the vector processor generates results, they are loaded in the result staging reqister until a predetermined number of results (sufficient, for example, to fill a line of the vector memory) have been accumulated. Then, the multiple results are transferred to the vector memory in one access. A multiplexer selectively transfers a selected one of the multiple operands from an operand staging register to the processor, and transfers a result from the processor to a selected one of multiple locations in the result staging register.

Another general feature of the invention provides a method for managing access to a shared data processing resource (such as a vector memory port) by a number of possible users, comprising preassigning to each user time slots that occur from time to time in each of which only one user is permitted to request access to the resource, establishing a nominal priority ranking of types of requests made by the users for governing the order in which the users will be served, providing an arbitration mechanism for resolving conflicting requests by the users for access to the shared resource based on the types of requests, and modifying the nominal priority ranking to temporarily lower the priority of a type of request made by a user that has previously been given access to the resource as a result of the arbitration mechanism but has been unable to execute the access.

Thus, if in one cycle a given user having a high priority request is given access to the resource but cannot use it, in the next cycle that request loses its priority over other types of requests for access to the shared resource made by other users. This prevents the initially higher-priority request from unnecessarily denying other requests access to the shared resource over several cycles.

In preferred embodiments, the users are served in the order of the modified priority ranking, and the priority of the type of request made by the user that has been given access is temporarily lowered to fall below the user making the type of request that would be last in line to be served as of the time that the lowering of priority occurs. The type of request is restored to its original priority in the nominal priority ranking for the next arbitration. The user's request is granted if no other user has access to said resource. A dominant user, permitted to request access to the resource at any time, is provided and priority is given to the dominant user ahead of any type of request made by the other users for access. The shared resource is a port or a plurality of ports of a vector memory for use in a vector unit. The dominant user comprises a vector controller and each other user comprises an instruction stream. The preassigned time slots occur cyclically in a repeated predetermined sequence.

Other advantages and features will become apparent from the following description of the preferred embodiment and from the claims.

DESCRIPTION OF THE PREFERRED EMBODIMENT

We first briefly describe the drawings.

FIG. 2 is a chart illustrating the operation of the single port vector RAM.

Structure and Operation

Figure 1:
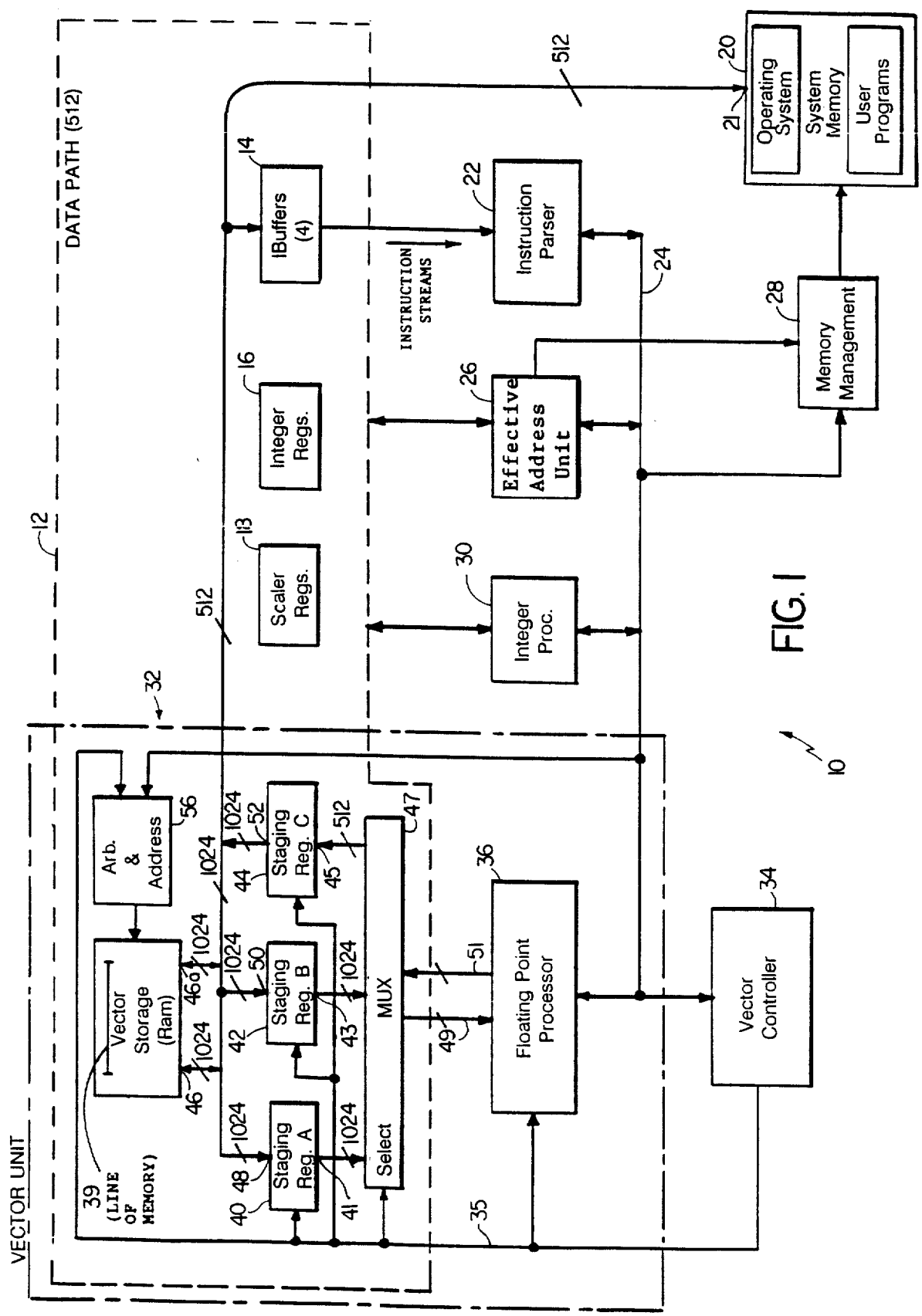
FIG. 1 is a block diagram of a synchronous-pipeline, multi-processor (SPMP) computer including a single-port vector RAM.

Referring to FIG. 1, a synchronous-pipeline, multi-processor (SPMP) computer 10 is organized around a 512-bit wide data path 12 implemented as thirty-two application specific integrated circuits (ASICs) (i.e., gate arrays). Data path 12 includes an instruction buffer (IBuffer) 14, a set of general purpose integer registers 16, and a set of scalar registers 18 for each of four streams of the pipeline. Data path 12 communicates with a system memory 20 via a single data port 21. System memory 20 transfers data to and from data path 12 and also provides instructions to IBuffers 14 based on an operating system and one or more user programs stored in memory 20.

IBuffers 14 sequentially apply the four streams of instructions in a pipeline manner to a single instruction parser 22, which decodes the instructions and applies them on instruction pipeline 24 for execution by other units in SPMP system 10. Decoded instructions are applied to effective address (EA) unit 26, which generates effective (virtual) memory addresses and applies them to memory management unit 28. Memory management unit 28 addresses system memory 20 based on the effective addresses and instructions on pipeline 24. The decoded instructions are also applied to a general purpose integer processor 30.

Decoded instructions on pipeline 24 additionally control the operation of vector unit 32 and vector controller 34. Vector unit 32 includes a vector processor 36 (available as a floating point processor manufactured by Weitek Corporation of Sunnyvale, CA, as part Nos. 2264 and 2265), which responds to the decoded instructions and to control signals from vector controller 34. Vector unit 32 also includes vector storage RAM 38, three staging registers 40, 42, 44, and multiplexer (mux) 47 located within data path 12. As discussed in detail below, staging registers 40, 42 are "source" staging registers for receiving multiple operands for vector operations from vector RAM 38 in a single access and sequentially delivering them to floating point processor 36, via mux 47, under the control of vector controller 34. Staging register 44 functions as a "destination" staging register for sequentially receiving, via mux 47, results of vector operations performed by floating point processor 36 and applying multiple results in parallel to vector RAM 38 in one access under the direction of vector controller 34.

In SPMP system 10, a vector data element has 32 bits for single precision computations and 64 bits for double precision. Source staging registers 40, 42 have a 16 element, double precision (i.e., 1024-bit) capacity, while destination staging register 44 has a capacity of eight double precision elements (i.e., 512 bits). Vector RAM 38 includes 1024-bit wide data access port 46 for transferring data between vector RAM 38 and staging registers 40, 42, 44 or system memory 20. Thus, each line 59 of vector RAM 38 is 1024 bits wide (and may thus contain up to 16 double precision vector operands or results). Vector RAM 38 is organized as 24 "vector registers", six per instruction stream. Each "vector register" contains thirty two 64-bit elements and thus requires two lines of vector RAM 38. It is thus seen that vector RAM 38 is 48 lines deep. Physically, vector RAM 38 is implemented as thirty-two 24×32 single port RAMs operating in parallel.

Vector RAM 38 is addressed, and access to vector RAM 38 is managed, by arbitrator and addressor 56, which receives the four streams of instructions on instruction pipeline 24 and keeps track of the timing of the instruction streams (i.e., addressor 56 knows which stream is ready to begin a vector operation at any given time). Arbitrator and addressor 56 also receives any instructions currently executing in vector unit 32 from vector controller 34.

Source staging registers 40, 42 are each fully loaded by vector RAM 38 in a single clock pulse (i.e., tick). That is, input ports 48, 50 of source staging registers 40, 42 are each 1024 bits wide. Similarly, destination staging register 44 transfers its entire contents to vector RAM 38 in a single tick, and thus has a 512-bit wide output port 52. Likewise, the entire contents of staging registers 40, 42, 44 are available to mux 47; that is, output ports 41, 43 of source staging registers 40, 42 are 1024 bits wide and are connected directly to mux 47, and destination register input port 45 is 512 bits wide and is also directly connected to mux 47.

Mux 47 is controlled by vector controller 34 to couple selected vector elements in source staging registers 40, 42 (that is, selected single precision or double precision operands of the up to 16 operands in each register 40, 42) to floating point processor 36 via bus 49. Similarly, mux 47 is selected by vector controller 34 to couple a given vector result, available from floating point processor 36 on bus 51, to a particular location in destination staging register 44 selected by vector controller 34.

In operation, high bandwidth performance of vector RAM 38 is achieved by the broad width of RAM access port 46 in conjunction with source staging registers 40, 42 and destination staging register 44. Vector operands are loaded into vector RAM 38 from system memory 20 such that multiple elements of a first vector operand are transferred to one line of vector RAM 38, and the corresponding elements of a second operand which is, e.g., to be added with the first vector operand, are transferred to another line of vector RAM 38. This process is known as a vector load (VLD). For example, consider a vector operation in which 32 element vector A is to be added to 32 element vector B. The first 16 elements (1–16) of vector A (single or double precision) are loaded in line $38_1$ of vector RAM 38, and the second 16 elements (17–32) of vector A are loaded in vector RAM line $38_2$. Likewise the first 16 elements of vector B are loaded in line $38_3$ and the second 16 elements loaded in line $38_4$ of vector RAM 38.

Referring to FIG. 2, in the two clock periods before a given instruction stream is to begin executing a vector operation (i.e., ticks $t_{-1}$ and $t_0$). arbitrator and addressor 56 respectively addresses line $38_1$ of vector RAM 38 (to load the first 16 elements of vector A in source staging register 40) and line $38_3$ of vector RAM 38 (to load the first 16 elements of vector B into source staging register 42). That is, arbitrator and addressor 56 anticipates that the stream will begin a vector operation in $t_1$, and readies the data for the vector operation by loading source staging registers 40, 42. It is seen that vector RAM 38 need be accessed only twice to load 16 operands in each staging register 40, 42 via RAM port 46.

During subsequent clock periods (i.e., once the vector operation begins), an element of vector A and a corresponding element of vector B are applied, via mux 47, to floating point processor 36, operated on (e.g., added together), and the result loaded, via mux 47, as an element in destination staging register 44. There, results of successive operations are accumulated until destination staging register 44 is filled (i.e., with 8 results). The results are then stored in vector RAM 38. In the example, the first eight results are transferred by destination staging register 44 into line $38_5$ of vector RAM 38 at time $t_{12}$. This occurs simultaneously as floating point processor 36 continues to operate on the remainder of the first 16 vector elements in source staging registers 40, 42. Thus, it is noted that destination staging register 44 needs to have high priority access to vector RAM 38. If destination staging register 44 is denied access to vector RAM 38 when full, its contents would be written over by the results of later operations.

As source staging registers 40, 42 are emptied of operands by floating point processor 36, vector controller 34 sequentially addresses lines $38_2$, $38_4$ of vector RAM 38 to load elements 17-32 of vectors A and B into source staging registers 40, 42. That is, registers 40, 42 are refilled simultaneously as the 16th vector elements are used by floating point processor 36. Thus, operands 17-32 of vector A are loaded in source staging register 40 during $t_{15}$ and vector B operands 17-32 are loaded in source staging register 42 in $t_{16}$. Meanwhile, floating point processor 36 is completing the fifteenth and sixteenth vector operations and loading the results in destination staging register 44. Beginning in the 17th clock period, floating point processor 36 starts operating on elements 17-32 of vectors A and B.

The results of vector operations on elements 9-16 of vectors A and B are accumulated in destination staging register 44 by the 20th tick and are transferred to line $38_6$ of vector RAM 38 in $t_{20}$ simultaneously as floating point processor 36 continues obtaining and operating on operands from source staging registers 40, 42, and loading new results in destination staging register 44.

The results of vector operations on elements 17-24 are accumulated in destination staging register 44 by the 28th tick. Resulting vector elements 17-24 are transferred to line $38_7$ of vector RAM 38 in that clock period ($t_{28}$) simultaneously as the remaining operand elements 25-32 are being operated on and the results loaded in destination staging register 44. The vector operation on elements 25-32 is then completed by floating point processor 36, and results 25-32 are loaded in destination staging register 44 and then transferred to line $38_8$ of vector RAM 38 in a single clock period (tick $t_{36}$). Meanwhile, in clock periods $t_{31}$, $t_{32}$, vector RAM 38 loads elements 1-16 of operands C and D for a subsequent vector instruction in source staging registers 40, 42. Thus, floating point processor 36 can begin operating on the new elements immediately after completing operation on elements 32 of operands A and B.

Thus, while vector operations on the 32-element operands takes 32 clock periods, the entire operation requires only 8 transfers to and from vector RAM 38 via port 46. That is, vector RAM 38 need be accessed in only 8 ticks of the 32 tick operation. This leaves 24 free clock periods during which vector RAM 38 may be reloading source staging registers 40, 42 (e.g., with operands C and D) or transferring data to and from system memory 20. Thus, transfers to and from system memory 20 are fully overlapped with the operation of floating point processor 36, thereby improving the overall operating efficiency of vector unit 32.

Figure 3A:
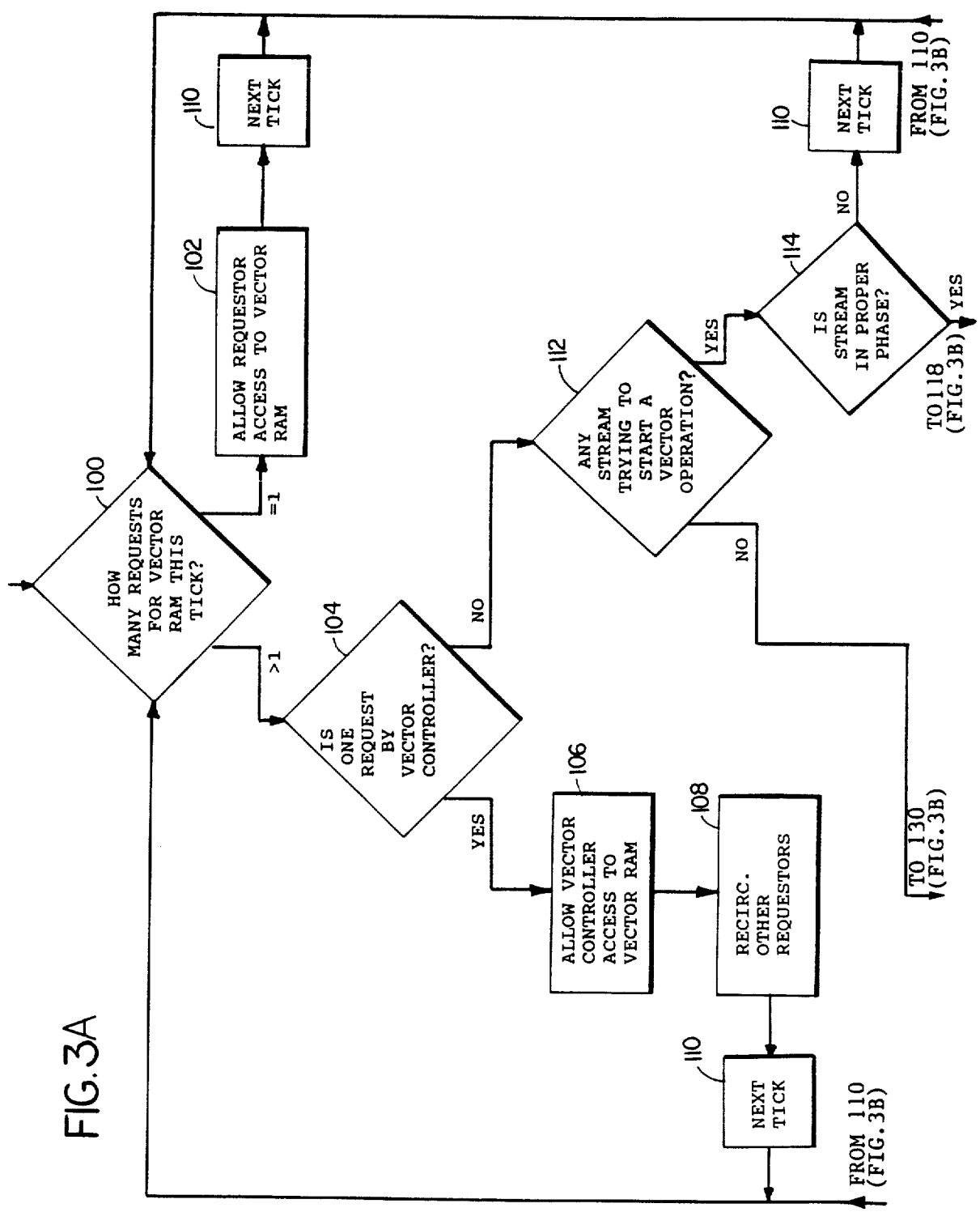
FIG. 3 is a flow chart of the process of arbitration for access to the single-port vector RAM.
Figure 3B:
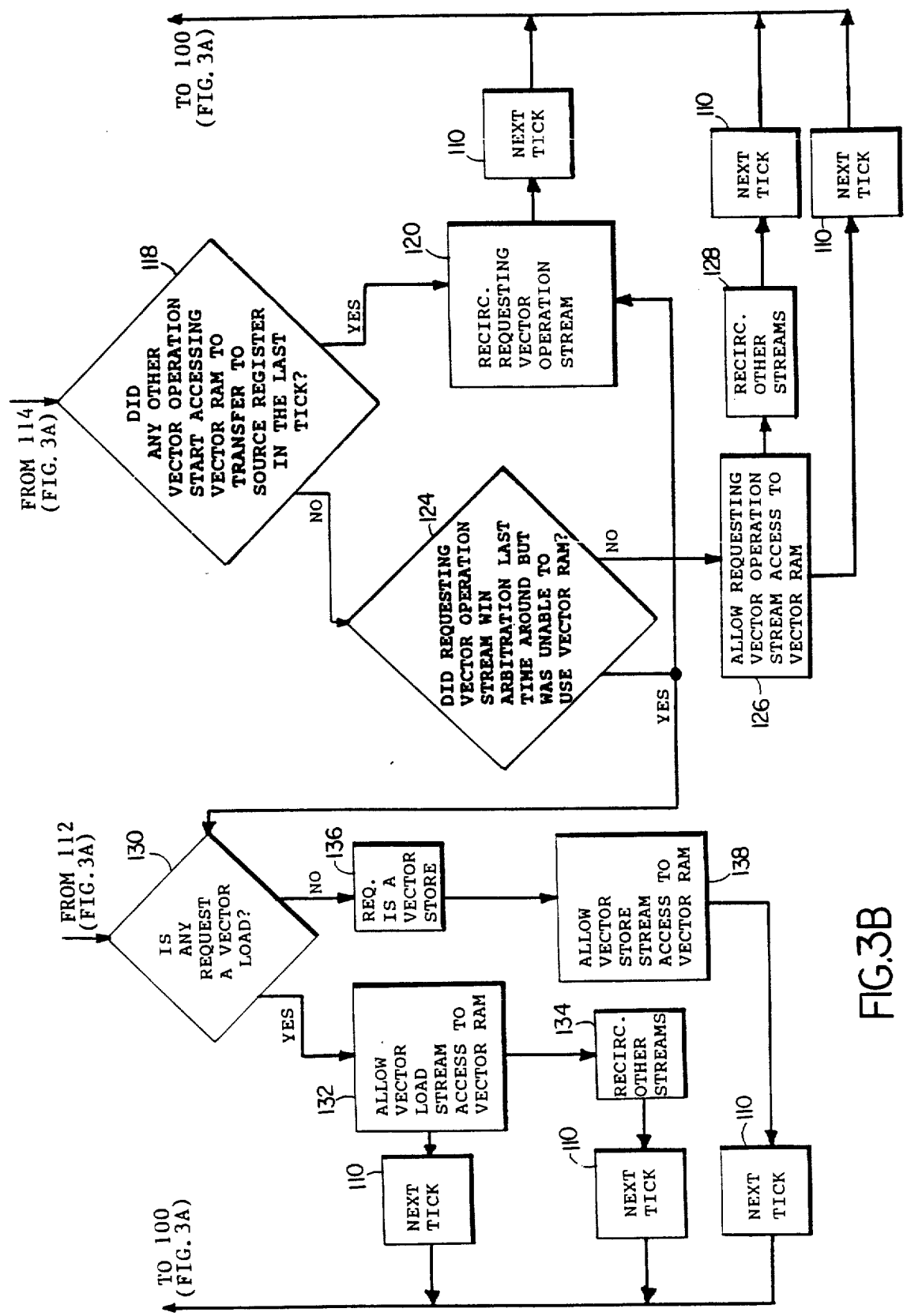

Referring to FIGS. 1 and 3, in any given clock period (i.e., tick), arbitrator 56 may receive up to five requests for access to port 46 of vector RAM 38: one request from each of the four instruction streams on pipeline 24; and a request based on an instruction from vector controller 34 (on line 35) which is currently executing in vector unit 32. The requests are assigned an initial priority based on the identity of the instruction and the entity (i.e., an instruction stream or vector controller 34) making the request; arbitrator 56, in each tick, adaptively re-prioritizes requests which were previously given access to vector RAM 38 but did not utilize the RAM.

The instructions for which access to vector RAM 38 are requested are:

1. VOP—any vector operation (for example, a vector addition) which is requesting either to transfer data from vector RAM 38 to a source staging register 40, 42, or from destination staging register 44 to vector RAM 38. A VOP instruction may be made by an instruction stream which is trying to start a vector operation or by vector controller 34 for a vector operation already in progress.
2. VLD—an instruction for loading data into vector RAM 38 from system memory 20. This instruction is made only by an instruction stream.
3. VST—an instruction for storing data from vector RAM 38 to system memory 20. This instruction is made only by an instruction stream.

During each clock period, arbitrator 56 determines how many requests are being made for access to vector RAM 38 by the four instruction streams and by vector controller 34 (100). If only one request is being made, there is no need for arbitration and the requesting instruction is allowed access (102) to vector RAM 38 regardless of whether the instruction is a VOP, VLD or VST and regardless of the identity of the requestor having a VOP instruction (i.e., instruction stream or vector controller 34).

If more than one request is being made, arbitrator 56 determines if one of the requests is by vector controller 34 (104). If so, arbitrator 56 assigns absolute priority to the instruction from vector controller 34 (which must be a VOP) and allows that instruction access to vector RAM 38 (106). This is done to avoid interrupting a vector operation currently executing in vector unit 32. All instruction streams on pipeline 24 which are then requesting access to vector RAM 38 are recirculated (108); that is, the instructions are maintained in the instruction pipeline, rather than being executed and exiting the pipeline. Arbitrator 56 signals a recirculation by sending a control signal to instruction parser 22 via pipeline 24. The recirculated instructions again enter the arbitration procedure (100) during the next clock period (110).

The microcode of vector unit 32 is structured so that vector controller 34 will not simultaneously request access to vector RAM 38 for transfer to or from more than one staging register 40, 42, 44 at a time. That is, in a given clock period, vector controller 34 will not attempt to transfer one line of vector RAM 38 to source staging register 40 and another line of vector RAM 38 to source staging register 42. Nor will vector controller 34 attempt to load a source staging register 40 or 42 from vector RAM 38 and empty destination staging register 44 into vector RAM 38 during the same tick. Should the microcode be written to allow the latter situation to occur, a VOP instruction to transfer data from destination staging register 44 to vector RAM 38 would have to be given priority over a VOP instruction to transfer data into a source staging register 40, 42 from vector RAM 38. Otherwise, data in destination register 44 would be lost (i.e., written over by the continued operation of floating point processor 36) if a requested transfer from destination staging register 44 is delayed.

If one of the multiple requests for access to vector RAM 38 is not made by vector controller 34 (104), this indicates that a vector operation is not currently in progress in vector unit 32. Arbitration is then between multiple requesting streams on instruction pipeline 24. Arbitrator 56 determines whether any of the requesting instruction streams contains a VOP instruction (112), that is, whether any of the streams requesting access to vector RAM 38 are trying to begin actually using vector unit 32. VOP instructions are in general given priority by arbitrator 56 over the other types of accesses (VLD or VST) by the instruction streams. This is because VOP transfers involve staging registers 40, 42, 44, which are much more limited in size than system memory 20, used for VLD and VST transfers. Because more than one instruction stream could need access to vector unit 32 at essentially the same time, the instruction pipeline is structured as a multiple-phase (here four phase) pipeline, with the four instruction streams offset in phase relative to one another. An instruction can begin to use vector unit 32 only in a predetermined phase. Thus, no two instructions can begin using vector unit 32 in the same tick. Only the stream having a VOP instruction in the proper phase of the pipeline (114) can possibly obtain access to vector RAM 38 in the tick. All other streams with VOP instructions must begin the arbitration process (100) again starting in the next clock period (110).

For the one VOP instruction in the proper phase, arbitrator 56 determines whether any other VOP instruction from another instruction stream began using vector RAM 38 to load source staging registers 40, 42 in the previous tick (118). Because it takes two clock periods to load source staging registers 40, 42—one for each register—the previous VOP instruction will still be using vector RAM 38 in this clock period, and arbitrator 56 assigns priority to the previous VOP instruction so that its execution will not be interrupted by the present VOP instruction. The present VOP instruction is denied access to vector RAM 38 this tick and recirculated (120).

If no other VOP instruction from another stream began using vector RAM 38 for loading source staging registers 40, 42 in the previous tick (or if the previous VOP instruction was to empty destination register 44, which takes only one tick), vector RAM 38 is free this tick (122). Arbitrator 56 then determines whether, in the most recent arbitration procedure, the stream containing the present VOP instruction successfully arbitrated for use of vector RAM 38 but was then unable to use vector RAM 38 for some reason (124). This adaptive arbitration prevents one stream from monopolizing access to vector RAM 38 every tick when the VOP instruction in that stream is unable to take advantage of the access.

For example, if a stream containing VOP instruction successfully arbitrates for vector RAM 38, but another instruction stream is then executing in vector unit 32, the stream will be blocked by vector controller 34 from beginning to use vector unit 32. Thus, vector controller 34 will direct arbitrator and addressor 56 to prevent the stream from transferring any data between vector RAM 38 and staging registers 40, 42, 44, and hence the stream's successful arbitration for vector RAM 38 over a VLD or VST instruction (which occurred in step 112) of another stream is wasted. To prevent this from occurring repeatedly, arbitrator 56 re-prioritizes such a VOP instruction (whose successful arbitration was wasted) with a lower priority than either a VLD or a VST instruction in another stream in the arbitration cycle immediately following the successful wasted arbitration by the VOP instruction. In that next arbitration cycle, the stream containing the VOP instruction loses arbitration to a competing stream having either a VLD or a VST instruction and is recirculated (120). But in the following cycle, arbitrator 56 re-establishes the usual priority of the VOP instruction over VLD and VST instructions, and allows the stream containing the VOP instruction access to vector RAM 38 (126) while recirculating the other streams (128). That is, the previously-recirculated VOP instruction is assigned a lower priority only every other cycle.

If the priority of the VOP instruction is temporarily lowered (124) or if none of the requesting instruction streams contain a VOP instruction (112), arbitrator 56 determines whether one of the remaining requestors of vector RAM 38 contains a VLD instruction (130). In the arbitration scheme, a VLD instruction is given priority over a VST instruction. Thus, if one of the streams includes a VLD instruction, that instruction is given access to vector RAM 38 (132) and the other requesting streams are recirculated (134).

On the other hand, if none of the remaining streams requesting access to vector RAM 38 is a VLD, it must be a VST instruction (136), the lowest priority instruction (except for a VOP instruction having a temporarily lowered priority (124)). The VST instruction is then given access to vector RAM 38 (138).

Other embodiments are within the following claims. For example, the invention can be utilized with a multiple port vector RAM as well as a vector RAM having a single port 46. That is, vector RAM 38 could also include port 46a. The arbitration scheme of the invention would be used for each port.

What is claimed is:

1. Apparatus for performing vector operations on the data elements of vector comprising a vector processor for performing operations on said elements, a vector memory for storing said data elements for use by said processor, said vector memory having a port for reading and writing, and at least one staging register interposed between said vector memory port and said processor, said port and said register each being sufficiently wide to span more than one said data element, whereby on average fewer than one read or write operation per data element is required to access said vector memory via said port to transfer multiple data elements between said vector memory and said staging register.

2. The apparatus of claim 1 wherein said vector memory has a single said port.

3. The apparatus of claim 1 wherein said vector memory includes a plurality of said ports.

4. The apparatus of claim 1 wherein each line of memory in said vector memory contains multiple data elements, and said staging register is capable of containing multiple data elements, whereby said multiple data elements are transferred between a line of memory and said staging register in a single access.

5. The apparatus of claim 1 wherein each line of memory contains multiple operand and result data elements, and further comprising operand staging registers, each capable of containing multiple operand data elements.

a controller for causing multiple operand data elements to be transferred from a line of said vector memory to a first operand staging register in a first single access, and causing multiple operand data elements to be transferred from a line of said vector memory to a second operand staging register in a second single access, said vector processor operating on the operand data elements in said first and second operand staging registers and generating result data elements, and a result staging register for storing multiple result data elements from said processor, said controller causing said multiple result data elements to be transferred from said result staging register to a line of said vector memory in a third single access.

6. The apparatus of claim 5 further comprising a multiplexer, responsive to control signals from said controller, for transferring a selected one of the multiple operand data elements from one of said operand staging registers to said vector processor and for transferring a result data element from said vector processor to a. selected one of multiple locations in said result staging register.

7. The apparatus of claim 1 wherein said operations performed by said vector processor are arithmetic operations.

8. A method of performing vector operations on the data elements of vectors, comprising storing said data elements in a vector memory for use by a vector processor which performs operations on said elements, said vector memory having a port for reading and writing, and transferring said data elements between said vector memory and at least one staging register that is interposed between said vector memory port and said processor, said port and said register each being sufficiently wide to span more than one said data element so that on average fewer than one read or write operation is required to access said vector memory via said port.

9. The method of claim 8 wherein said operations performed by said vector processor are arithmetic operations.

* * * * *

UNITED STATES PATENT AND TRADEMARK OFFICE
CERTIFICATE OF CORRECTION

PATENT NO. : 4,949,247
DATED : August 14, 1990
INVENTOR(S) : R. Ashley Stephenson et al It is certified that error appears in the above-indentified patent and that said Letters Patent is hereby corrected as shown below:

Col. 1, line 52, "reqisters" should be --registers--.

Col. 3, line 50, the numeral "59" should be --39--.

Col 8, claim 1, line 33, "vector" should be --vectors--.

Signed and Sealed this

Fourteenth Day of September, 1993

Attest:

BRUCE LEHMAN

Attesting Officer

Commissioner of Patents and Trademarks